United States Patent [19]
Pechanek et al.

[11] Patent Number: 5,784,632
[45] Date of Patent: Jul. 21, 1998

[54] PARALLEL DIAGONAL-FOLD ARRAY PROCESSOR

[75] Inventors: Gerald George Pechanek, Endwell; Stamatis Vassiliadis, Vestal; Jose Guadalupe Delgado-Frias, Endwell, all of N.Y.

[73] Assignee: International Business Machines Corporation, Armonk, N.Y.

[21] Appl. No.: 415,775

[22] Filed: Mar. 30, 1995

Related U.S. Application Data

[63] Continuation of Ser. No. 881,597, May 12, 1992, abandoned.

[51] Int. Cl.$^6$ ............................................. G06F 15/00
[52] U.S. Cl. ................... 395/800; 364/229.1; 364/231.9; 364/DIG. 1
[58] Field of Search ............... 395/800; 364/231.9, 364/229.1, DIG. 1

[56] References Cited

U.S. PATENT DOCUMENTS

| | | | |
|---|---|---|---|
| 4,514,807 | 4/1985 | Nogi . | |
| 4,633,392 | 12/1986 | Vincent et al. | 364/DIG. 1 |
| 4,884,193 | 11/1989 | Lang | 364/DIG. 1 |
| 4,907,148 | 3/1990 | Morton | 364/DIG. 1 |
| 4,922,418 | 5/1990 | Dolecek | 364/DIG. 1 |
| 4,942,517 | 7/1990 | Cok . | |
| 5,224,100 | 6/1993 | Lee et al. | 370/94.3 |
| 5,249,231 | 9/1993 | Covey et al. | 380/25 |
| 5,287,481 | 2/1994 | Lin | 395/425 |

OTHER PUBLICATIONS

WO-91-18351 (IBM Corp) Nov. 28, 1991 PCT/US91/03317, European patent filed May 17, 1991, Pyramid Learning Architecture Neurocomputer, G.G. Pechanek et al.

GB 2 219 106 A UK Patent Application Nov. 29, 1989 files May 26, 1988, Processor for Constrained Least Squares Computations, The Secretary of State for Defense Whitehall, London, SW1A 2HB United Kingdom.

IBM Technical Disclosure Bulletin, vol. 34, No. 10A, Mar. 1992, pp. 100–106, "Many–Snap".

IEEE International Conference on Computer Design: VLSI in Computers Oct. 06, 1986, Port Chester, USA, pp. 269–274, D. Koppelman et al "The Implementation of a Triangular Permutation Network Using Wafer Scale Integration".

"The Application and Development of Wavefront Array Processors for Advanced Front–end Signal Processing Systems" *Systdlic Arrays First International Workshop*, Oxford U.K., Jul. 2–4, 1986, by Moore, et al., pp. 295–301.

*Primary Examiner*—Alyssa H. Bowler
*Assistant Examiner*—John Harrity
*Attorney, Agent, or Firm*—Eugene Shkurko; John Hoel; Steven B. Phillips

[57] ABSTRACT

A massively parallel processor apparatus having an instruction set architecture for each of the $N^2$ the PEs of the structure. The apparatus which we prefer will have a PE structure consisting of PEs that contain instruction and data storage units, receive instructions and data, and execute instructions. The $N^2$ structure should contain "N" communicating ALU trees, "N" programmable root tree processor units, and an arrangement for communicating both instructions, data, and the root tree processor outputs back to the input processing elements by means of the communicating ALU trees. The apparatus can be structured as a bit-serial or word parallel system. The preferred structure contains $N^2$ PEs, identified as $PE_{column, row}$, in a N root tree processor system, placed in the form of a N by N processor array that has been folded along the diagonal and made up of diagonal cells and general cells. The Diagonal-Cells are comprised of a single processing element identified as $PE_{i,i}$ of the folded N by N processor array and the General-Cells are comprised of two PEs merged together, identified as $PE_{i,j}$ and $PE_{j,i}$ of the folded N by N processor array. Matrix processing algorithms are discussed followed by a presentation of the Diagonal-Fold Tree Array Processor architecture. The Massively Parallel Diagonal-Fold Tree Array Processor supports completely connected root tree processors through the use of the array of PEs that are interconnected by folded communication ALU trees.

9 Claims, 14 Drawing Sheets

DIAGONAL "CELL"

T-SNAP ORIGINAL
WEIGHT /Y VALUE
MULITIPLICATION
STRUCTURE

G - "CELLS"

DREG = DATA REGISTER

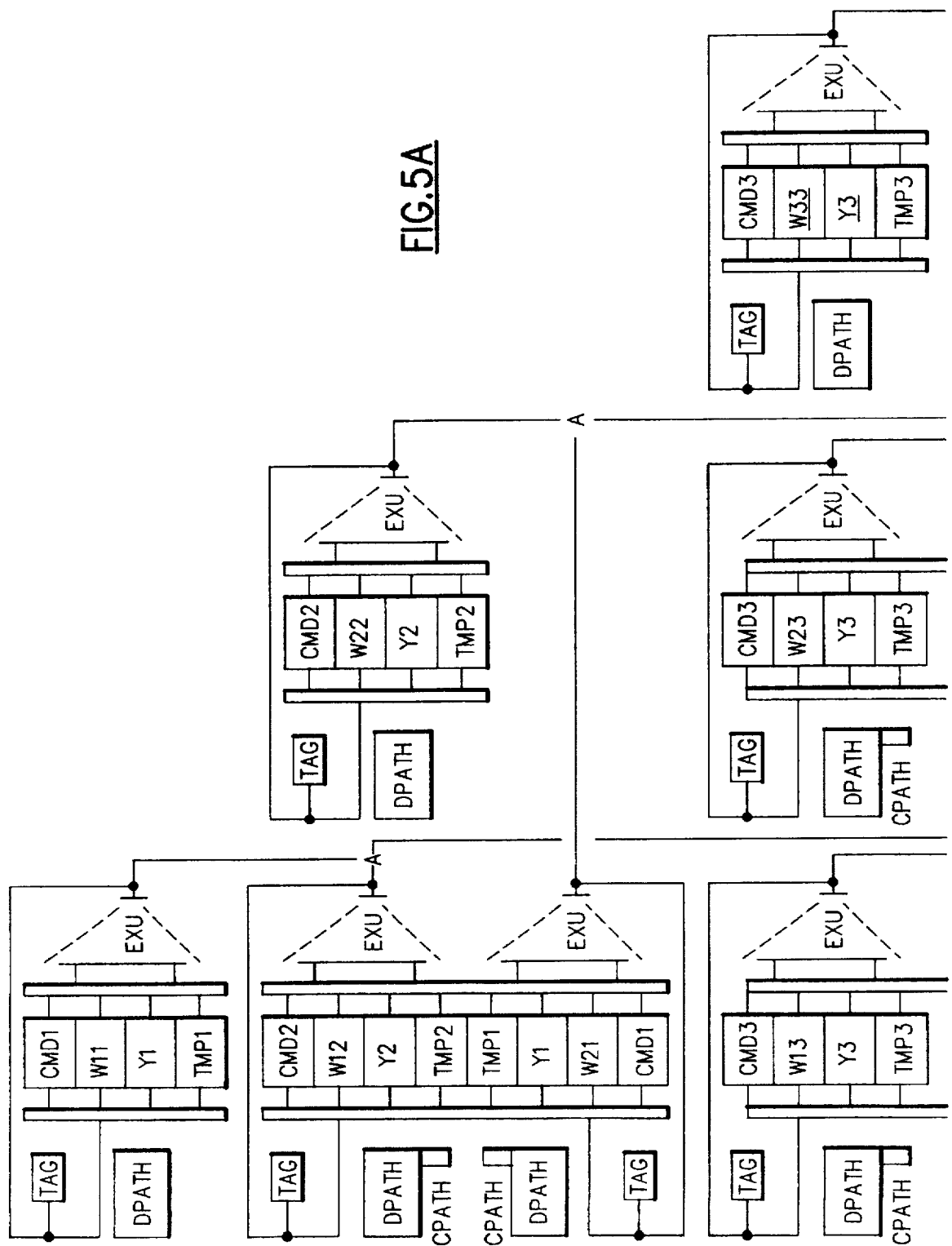

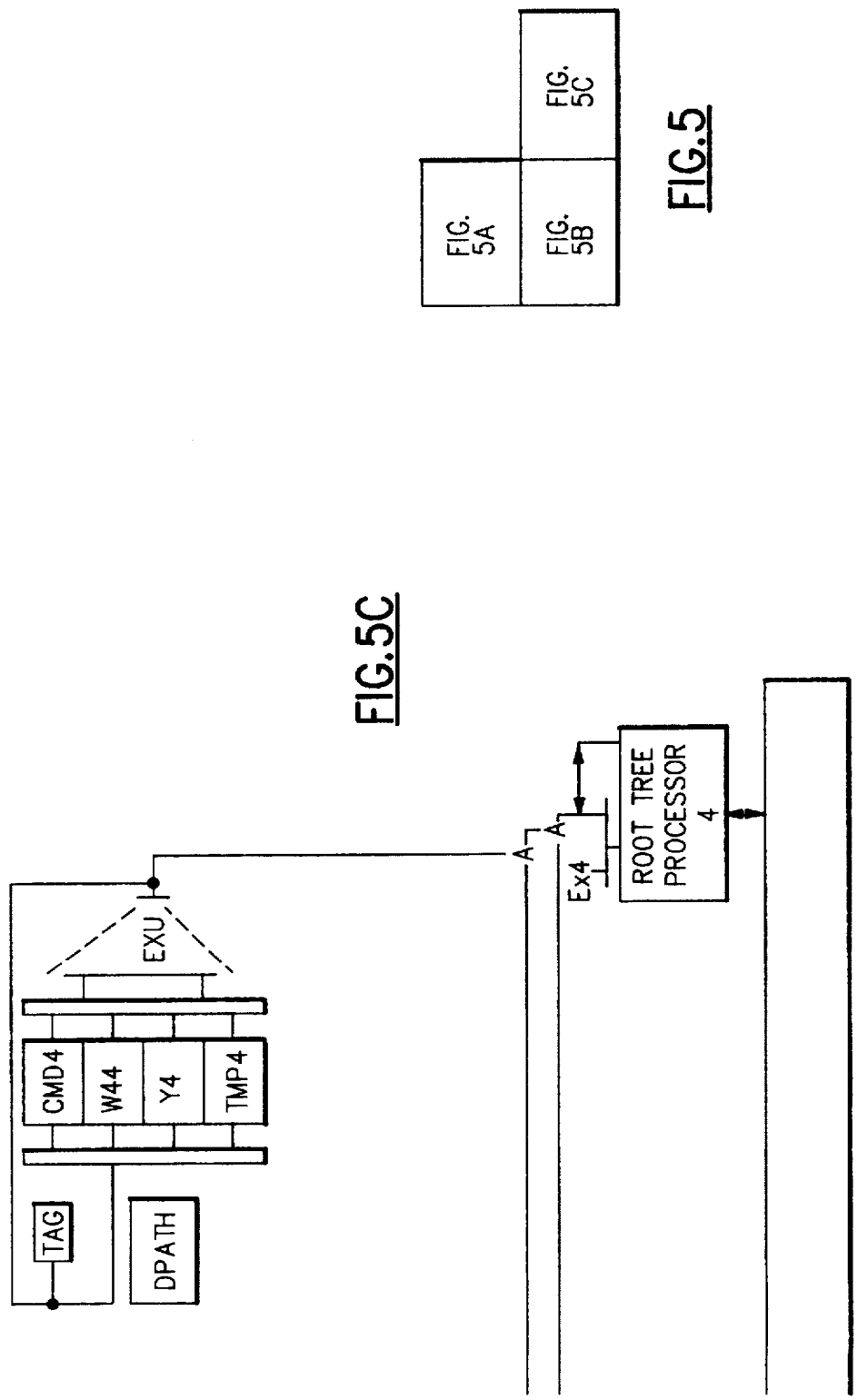

| IMMED.DATA | COMMENTS |
|---|---|
| C E B / NOT USED (N.U.) | IF DESTINATION IS CR1 SET THE CMD PATH BIT TO A 0, IF IT IS CR2 SET THE CMD PATH BIT TO A 1. (CEB FIELD NOT USED) ELSE SET THE DATA PATH REGISTER TO THE DESTINATION ADDRESS AND THE DESTINATION REGISTER'S CEB AS SPECIFIED. |
| N.U. | NO OPERATION |
| DATA | IMD1/2 = CMD REG 1/2 IMMEDIATE DATA |
| DATA | CEB VECTOR = (CEB1,CEB2, ..., CEB6) WHERE CEBx = CEB BIT FOR REGISTER Rx |
| DATA | |
| DATA | LT = SOURCE-1 < SOURCE-2<br>GT = SOURCE-1 > SOURCE-2<br>EQ = SOURCE-1 = SOURCE-2 |
| SHIFT TYPE & SHIFT AMOUNT | THE FIRST PART OF THE IMMEDIATE DATA SPECIFIES TYPE OF SHIFT OPERATIONS, eg. WITH OR WITHOUT WRAPAROUND. THE SECOND PART SPECIFIES THE NUMBER OF BIT SHIFTS. |
| N.U. | IF SOURCE-1 = CEB VECTOR THE SIX CEB BITS ARE PACKED INTO THE MSB BITS OF THE RESPONSE.<br>IF SOURCE-1 = CMP FLAGS THE THREE FLAG BITS ARE PACKED INTO THE MSB BITS OF THE RESPONSE. |

UPDATED DATA FROM SOURCE EXTERNAL TO PROCESSOR ELEMENT

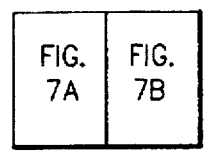

| INSTRUCTION | *AUTO* | SOURCE 1 | SOURCE 2 | DESTINATION |
|---|---|---|---|---|
| PATH | N.U. | N.U. | N.U. | R1,R2,R3,R4, R5,R6 CR1,CR2 |
| NOP | N.U. | N.U. | N.U. | N.U. |
| ARITHMETIC (ADD,MPY,DIV, SQRT,etc.) | 0=NO 1=AUTO | R1,R2,R3,R4, R5,R6,IMD1, IMD2 | R1,R2,R3,R4, R5,R6,IMD1, IMD2 | R1,R2,R3,R4, R5,R6, ALU TREE |
| LOGICAL (AND,OR,EXOR, etc.) | 0=NO 1=AUTO | R1,R2,R3,R4, R5,R6,IMD1, IMD2, CEB VECTOR | R1,R2,R3,R4, R5,R6,IMD1, IMD2, CMP FLAGS | R1,R2,R3,R4, R5,R6, ALU TREE CEB VECTOR |
| INV | 0=NO 1=AUTO | R1,R2,R3,R4, R5,R6,IMD1, IMD2, CEB VECTOR | N.U. | R1,R2,R3,R4, R5,R6, ALU TREE CEB VECTOR |
| CMPR | 0=NO 1=AUTO | R1,R2,R3,R4, R5,R6,IMD1, IMD2 | R1,R2,R3,R4, R5,R6,IMD1, IMD2 | LT, GT, EQ FLAGS |
| SHIFT | 0=NO 1=AUTO | R1,R2,R3,R4, R5,R6,IMD1, IMD2 IMD2 | N.U. | N.U. |
| SENDREG | 0=NO 1=AUTO | R1,R2,R3,R4, R5,R6,IMD1, CEB VECTOR, CMP FLAGS | N.U. | ALU TREE |

*AUTO* = 1 → AUTOMATIC REPEAT OF FUNCTION AFTER RECEIPT OF

FIG.7A

▽ AMPLIFIER

▽ INVERTING AMPLIFIER

• RESISTOR IN Tij NETWORK

PARALLEL DIAGONAL-FOLD ARRAY PROCESSOR

The application is a continuation of application Ser. No. 07/881,597, filed May 12, 1992 now abandoned.

FIELD OF THE INVENTION

These invention relate to computers and particularly to massively parallel array processors.

CROSS REFERENCE TO RELATED APPLICATIONS

This continuing application claims priority and is filed before the patenting or abandonment of or termination of proceedings on the following parent applications or an application similarly entitled to the benefit of the filing date of these applications:

U.S. application Ser. No. 07/526,866, filed May 22, 1990, of S. Vassiliadis et al, entitled: Orthogonal Row-Column Neural Processor (now U.S. Pat. No. 5,065,339, issued Nov. 12, 1991); and its following pending divisional applications:

U.S. application Ser. No. 07/740,355,filed Aug. 5, 1991, of S. Vassiliadis et al, entitled: Scalable Nerual Array Processor (now issued U.S. Pat. No. 5,146,420) and, U.S. application Ser. No. 07/740,556,filed Aug. 5, 1991, of S. Vassiliadis et al, entitled: Adder Tree for a Neural Array Processor (now abandoned in favor or application Ser. No. 08/000,915, now issued U.S. Pat. No. 5,251,289); and, U.S. application Ser. No. 07/740,568, filed Aug. 5, 1991, of S. Vassiliadis et al, entitled: Apparatus and Method for Neural Processor (now co-pending); and, U.S. application Ser. No. 07/740,266, filed Aug. 5, 1991, of S. Vassiliadis et at, entitled: Scalable Neural Array Processor and Method (now issued U.S. Pat. No. 5,148,515); and U.S. application Ser. No. 07/682,786, filed Apr. 8, 1991, of G. G. Pechanek et al, entitled: Triangular Scalable Neural Array Processor (now co-pending); and U.S. application Ser. No. 07/681,842, filed Apr. 8, 1991, of G. G. Pechanek et al, entitled: SPIN: A Sequential Pipelined Neurocomputer (now issued U.S. Pat. No. 5,337,395); and U.S. application Ser. No. 07/702,261, filed May 17, 1991, of G. G. Pechanek et al, entitled: A Learning Machine Synapse Processor System Apparatus (now co-pending); and U.S. application Ser. No. 07/702,260,filed May 17, 1991, of G. G. Pechanek et al, entitled: Virtual Neurocomputer Architectures for Neural Networks (now issued U.S. Pat. No. 5,243,688); and U.S. application Ser. No. 07/702,262, filed May 17, 1991, of G. G. Pechanek et al, entitled: Scalable Flow Virtual Learning Neurocomputer (now abandoned in favor of U.S. application Ser. No. 08/069,695, now issued U.S. Pat. No. 5,325,464); and U.S. application Ser. No. 07/702,263, filed May 17, 1991, of G. G. Pechanek et al, entitled: PLAN: Pyramid Learning Architecture Neurocomputer (now co-pending); and U.S. application Ser. No. 07/864,112, filed Apr. 6, 1992, of G. G. Pechanek et al., entitled: Massively Parallel Array Processor (now co-pending).

In addition, filed concurrently is a related application:

U.S. application Ser. No. 07/881,594 filed May 15, 1992, of G. G. Pechanek et al, entitled: Scalable Massively Parallel Group Partitioned Diagonal-Fold Switching Tree Computing Apparatus now abandoned in favor of co-pending continuation application Ser. No. 08/496,826, filed Jun. 29, 1995. (IBM Docket EN9-92-065)

These applications and the present continuation-in-part application are owned by one and the same assignee, International Business Machines Corporation of Armonk, N.Y.

The descriptions set forth in these above applications are hereby incorporated into the present application.

REFERENCES USED IN THE DISCUSSION OF THE INVENTION

During the detailed description which follows the following works will be referenced as an aid for the reader. These additional references are:

1. U.S. application Ser. No. 07/799,602, filed Nov. 27, 1991, by H. Olnowich, entitled: "Multi-Media Serial Line Switching Adapter for Parallel Networks and Heterogenous and Homologous Computer Systems".
2. U.S. application Ser. No. 07/798,788, filed Nov. 27, 1991, by P. M. Kogge, entitled: "Dynamic Multi-mode Parallel Processor Array Architecture". (Systems which allow dynamic switching between MIMD, SIMD, and SISD.)
3. D. E. Rumelhart, J. L. McClelland, and the PDP Research Group, *Parallel Distributed Processing Vol. 1: Foundations* Cambridge, Mass.: MIT Press 1986. (Herein referred to as "Rumelhart 86".)
4. APPARATUS AND METHOD FOR NEURAL PROCESSOR, S. Vassiliadis, and G. G. Pechanek, U.S. application Ser. No. 07/526,866, filed May 18, 1990, (herein sometimes referred to as "SNAP" or "Vassiliadis SNAP 90".)
5. A TRIANGULAR SCALABLE NEURAL ARRAY PROCESSOR, G. G. Pechanek, and S. Vassiliadis, U.S. application Ser. No. 07/682,786, filed Apr. 8, 1991, (herein sometimes referred to as "T-SNAP" or "T-SNAP".)
6. A LEARNING MACHINE SYNAPSE PROCESSOR SYSTEM APPARATUS, G. G. Pechanek et al, U.S. application Ser. No. 07/702,261, filed May 17, 1991, (herein sometimes referred to at the "Learning Machine")
7. E. B. Eichelberger and T. W. Williams, "A Logic Design Structure for Testability," *Proceedings 14th Design Automation Conference*, IEEE, 1977. (Herein referred to as "Eichelberger 77".)
8. J. J. Hopfield, "Neurons With Graded Response Have Collective Computational Properties Like Those of Two-State Neurons," *Proceedings of the National Academy of Sciences* 81,pp. 3088–3092, May, 1984. (Herein referred to as "Hopfield 84".)
9. J. L. McClelland and D. E. Rumelhart, *Explorations in Parallel Distributed Processing: A handbook of Models, Programs and Exercises* Cambridge, Mass.: MIT Press, 1988. (Herein referred to as "McClelland 88".)
10. J. J. Hopfield, "Neural Networks and Physical Systems with Emergent Collective Computational Abilities," *Proceedings of the National Academy of Sciences* 79, pp. 2554–2558, 1982. (Herein referred to as "Hopfield 82".)
11. M. J. Flynn, J. D. Johnson, and S. P. Wakefield, "On Instruction Sets and Their Formats," *IEEE Transactions on Computers* Vol. C-34, No. 3, pp. 242–254, March 1985. (Herein referred to as "Flynn 85".)

These additional references are incorporated by reference.

BACKGROUND OF THE INVENTION

In the never ending quest for faster computers, engineers are linking hundreds, and even thousands of low cost microprocessors together in parallel to create super super-computers that divide in order to conquer complex problems that stump today's machines. Such machines are called massively parallel. Multiple computers operating in parallel have existed for decades.

Early parallel machines included the ILLIAC which was started in the 1960s. Other multiple processors include (see a partial summary in U.S. Pat. No. 4,975,834 issued Dec. 4, 1990 to Xu et al) the Cedar, Sigma-1, the Butterfly and the Monarch, the Intel ipsc. The Connection Machines, the Caltech COSMIC, the N Cube, IBM's RP3, IBM's GF11, the NYU Ultra Computer, the Intel Delta and Touchstone.

Large multiple processors beginning with ILLIAC have been considered supercomputers. Supercomputers with greatest commercial success have been based upon multiple vector processors, represented by the Cray Research Y-MP systems, the IBM 3090, and other manufacturer's machines including those of Amdahl, Hitachi, Fujitsu, and NEC.

Massively Parallel (MP) processors are now thought of as capable of becomming supercomputers. These computer systems aggregate a large number of microprocessors with an interconnection network and program them to operate in parallel. There have been two modes of operation of these computers. Some of these machines have been MIMD mode machines. Some of these machines have been SIMD mode machines. Perhaps the most commercially acclaimed of these machines has been the Connection Machines series 1 and 2 of Thinking Machines, Inc.. These have been essentially SIMD machines. Many of the massively parallel machines have used microprocessors interconnected in parallel to obtain their concurrency or parallel operations capability. Intel microprocessors like i860 have been used by Intel and others. N Cube has made such machines with Intel '386 microprocessors. Other machines have been built with what is called the "transputer" chip. Inmos Transputer IMS T800 is an example. The Inmos Transputer T800 is a 32 bit device with an integral high speed floating point processor.

As an example of the kind of systems that are built, several Inmos Transputer T800 chips each would have 32 communication link inputs and 32 link outputs. Each chip would have a single processor, a small amount of memory and communication links to the local memory and to an external interface. In addition, in order to build up the system communication link adaptors like IMS C011 and C012 would be connected. In addition switches, like a IMS C004 would be profided to provide, say, a crossbar switch between the 32 link inputs and 32 link outputs to provide point to point connection between additional transputer chips. In addition, there will be special circuitry and interface chips for transputers adapting them to be used for a special purpose tailored to the requirements of a specific device, a graphics or disk controller. The Inmos IMS M212 is a 16 bit process, with on chip memory and communication links. It contains hardware and logic to control disk drives and can be used as a programmable disk controller or as a general purpose interface. In order to use the concurrency (parallel operations) Inmos developed a special language, Occam, for the transputer. Programmers have to describe the network of transputers directly in an Occam program.

Some of these MP machines use parallel processor arrays of processor chips which are interconnected with different topologies. The transputer provides a crossbar network with the addition of IMS C004 chips. Some other systems use a hypercube connection. Others use a bus or mesh to connect the microprocessors and there associated circuitry. Some have been interconnected by circuit switch processors that use switches as processor addressable networks. Generally, as with the 14 RISC/6000s which were interconected last fall at Lawarence Livermore by wiring the machines together, the processor addressable networks have been considered as coarse-grained multiprocessors.

Some very large machines are being built by Intel and nCube and others to attack what are called "grand challenges" in data processing. However, these computers are very expensive. Recent projected costs are in the order of $30,000,000.00 to $75,000,000.00 (Tera Computer) for computers whose development has been funded by the U.S. Government to attack the "grand challenges". These "grand challenges" would include such problems as climate modeling, fluid turbulence, pollution dispersion, mapping of the human genome and ocean circulation, quantum chromodynamics, semiconductor and supercomputer modeling, combusion systems, vision and cognition.

Our Massively Parallel Diagonal-Fold Tree Array Processor architecture, which is the subject of this patent, is applicable for modeling high computational parallel data algorithms, for example matrix processing and high connectivity neural networks. To demonstrate the general processing capability of our system an example of matrix multiplication is included.

During the detailed discussion of our invention, we will reference other work including our own unpublished works, as mentioned above. These background literature references are incorporated herein by reference.

Problems addressed by our MP Diagonal-Fold Tree Array Processor.

It is a problem for massively parallel array processors to attack adequately the matrix processing problems which exist.

SUMMARY OF THE INVENTION

Our newly developed computer system may be described as a Massively Parallel (MP) Diagonal-Fold Tree Array Processor which operates in a Single Instruction Multiple Data (SIMD) fashion with general purpose application capability. The MP system we prefer will have a $N^2$ Processor Element (PE) structure in which each PE contains instruction and data storage units, receives instructions and data, and executes instructions. The $N^2$ PE structure should contain N communicating ALU trees, N Tree Root Processors (TRP), and a mechanism for communicating both instructions and data back to the PEs by means of the communicating ALU trees. preferred apparatus which will be described contains $N^2$ PEs placed in the form of a N by N matrix, with PEs identified by column-row subscripts $PE_{column,row} = PE_{ij}$, that has been folded along the diagonal and made up of Diagonal-PEs and General-PEs.

In our preferred system, the Diagonal-PEs are comprised of single Processing Elements, $PE_{ii}$, and the General-PEs are comprised of two symmetric Processing Elements, $PE_{ij}$ and $PE_{ji}$, that are merged together and which are associated with the same PE elements of the N by N PE array prior to folding.

Our new organization of PEs and new PE architecture is described in the best way we know to implement the improvements with an example implementation for matrix multiplication and discussion concerning neural network emulation, matrix addition, and Boolean operations.

These and other improvements are set forth in the following detailed description. For a better understanding of the invention, together with advantages and features, reference may be had to the co-pending applications for other developments we have made in the field. However, specifically as to the improvements, advantages and features described herein, reference will be made in the description which follows to the below-described drawings.

BRIEF DESCRIPTION OF THE DRAWINGS

FIG. 7 illustrates a PE example instruction set, and is divided into FIGS. 7A and 7B for convenience.

DETAILED DESCRIPTION OF PREFERRED EMBODIMENTS

Our detailed description follows as parts explaining our preferred embodiments of our invention provided by way of example.

MATRIX PROCESSING BACKGROUND

Figures 1, 2, 4:
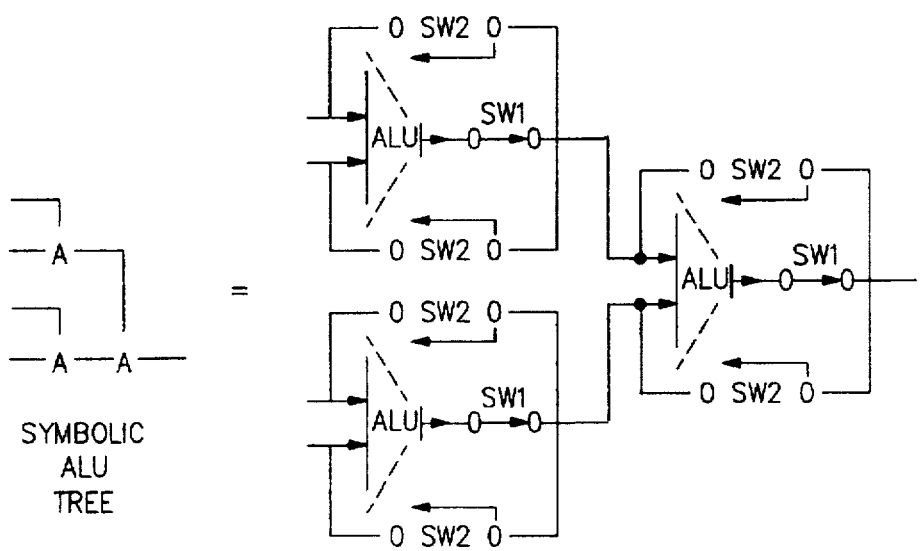
FIG. 1 illustrates a vector matrix multiplication operation.
FIG. 2 illustrates general matrix multiplication.
FIG. 4 shows a preferred communicating ALU tree.

A vector martix multiplication operation utilizing a sum of product calculation especially suited for our preferred MP organization is shown in FIG. 1 where there are i columns and j rows. The input matrix $z_i$ is defined as:

$$z_j = Y_1 W_{j1} + Y_2 W_{j2} + \ldots + Y_N W_{jN}$$

This is a subset of the general case of matrix multiplications. Consider the three N×N matrices, Y, W, and (Y * W) result matrix z, as shown in FIG. 2, with i columns and j rows and a notation of $Y_{(column),(row)}$. It is assumed that a MP Diagonal-Fold Tree Array Processor is available with the following assumed capabilities:

N Root Tree Processors: each possessing a Y value memory capacity of N Y values and an additional memory capacity for N result values.

$N^2$ PEs with the W values to be stored in internal PE registers.

The Root Tree Processor complex issues all instructions in broadcast mode.

The algorithmic procedure to be described represents only one of many possibilities and is not necessarily the "best" procedure depending upon an application. It is meant to demonstrate the capability of our MP Diagonal-Fold Tree Array Processor. The basic procedure is to have N Root Tree Processors send a row of the Y matrix and a multiplication instruction, with the Auto mode specified, to the PEs which execute the multiplication and send the results to the CATs for summation, providing a row of the result matrix back to the Root Tree Processors for storage. The Root Tree Processors then read out a new row of the Y matrix and send it back to the PEs, continuing generating a row of the result matrix at the output of the CATs and storing the row in memory until all result rows have been calculated. The W value matrix, once initialized in the PEs, remains fixed, internal to the PEs throughout the matrix multiplication operations.

3. PROCESSOR ELEMENT ARCHITECTURE

The TSNAP structure as described in—T-SNAP—required the HOST processor to provide update operations on PE stored data as required by a neural network model since T-SNAP—did not provide any PE update modification mechanisms. Additionally, T-SNAP does not provide the Root Tree Processor function capability provided by our present architecture. The Learning Machine structure as described in—Learning Machine—specifically addressed the capabilities available by a machine specifically tailored for neural network emulation as evidenced by the examples for Back-Propagation learning, and the high connectivity Hopfield neural networks. In order to accommodate "general" update rules on parallel stored data in the multiple PEs and provide "general" Root Tree Processor capabilities, major modifications to both T-SNAP and the Learning Machine are required. These modifications provide capabilities beyond those normally associated with the neural network paradigm. Instead of the fixed multiplication function provided in T-SNAP and limited instruction set architecture of the Learning Machine, a more general processor architecture is put in place with an expanded instruction set architecture and expanded data storage is allowed for. Both word parallel and bit serial operational modes available depending upon problem specific needs, as neither is precluded.

Figure 3A:
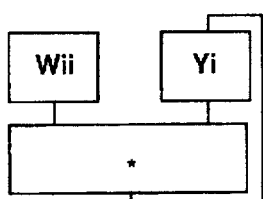
FIG. 3 shows a two value multiplication structure in two parts (3A—Diagonal Cell and 3B—General Cell), and our preferred processor architecture in two parts (3C—DIAGONAL PE and 3D—GENERAL PE).
Figure 3B:
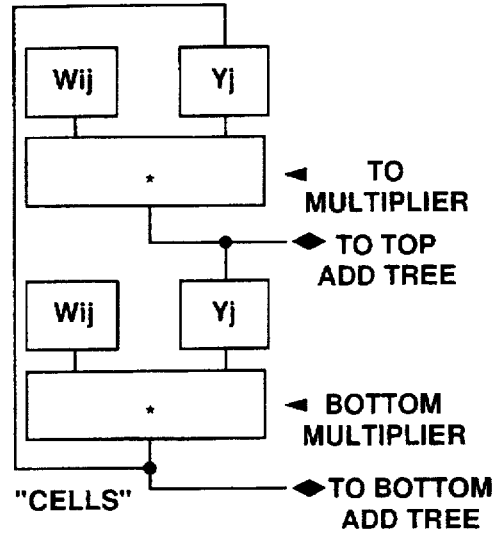
Figure 3C:
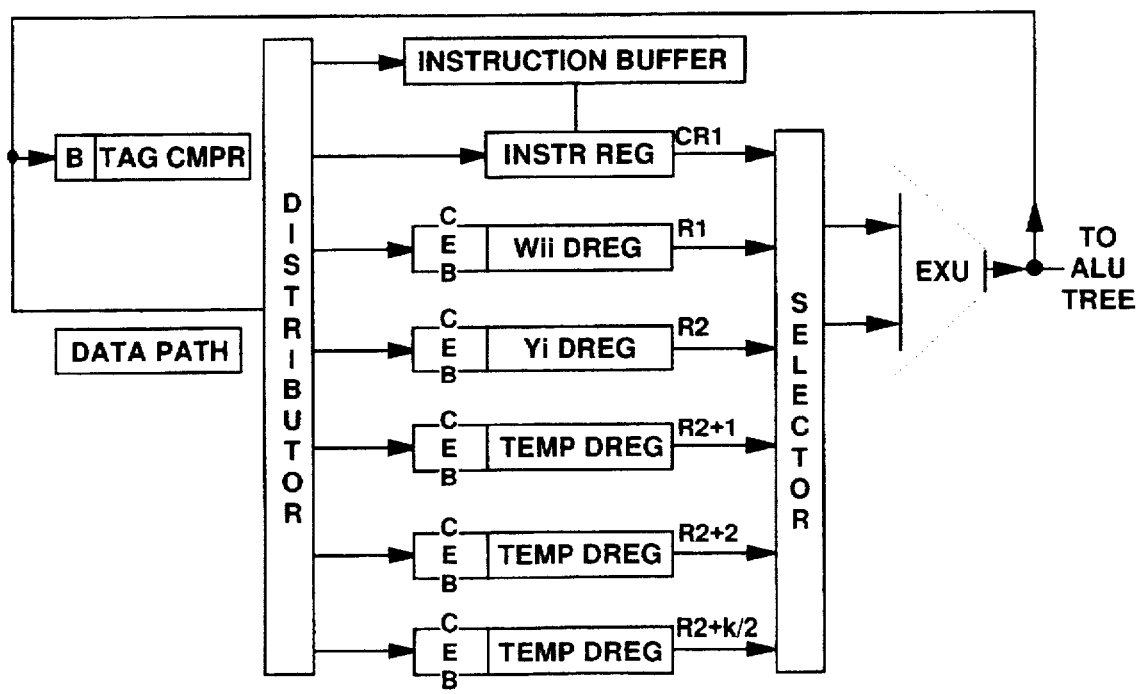

Internally, the T-SNAP structure utilized two types of "cell" structures, the Diagonal-Cells and the General-Cells for the direct emulation of the neural sum of products function and did not address the processing of locally stored data, for example as required by learning algorithms as described in Rumelhart 86 as follows. The rule for changing weights following presentation of input/output pair p is given by $$\Delta_p = w_{ji} = \eta(t_{pj} - O_{pj})i_{pi} = \eta\delta_{pj}i_{pi}$$

where $t_{pj}$ is the largest input for the jth component of the output pattern for pattern p, $O_{pj}$ is the jth element of the actual output pattern produced by the presentation of input pattern p, $i_{pi}$ is the value of the ith element of the input pattern, $\delta_{pj} = t_{pj} - O_{pj}$, and $\Delta_p w_{ji}$ is the change to be made to the weight from the ith to the jth unit following presention of pattern p. The basic multiplier element structures, without programmability are repeated in FIG. 3A and B, and new "cell" processing structures, with the additional local data manipulation capabilities provided by an instruction set architecture, are shown in and FIG. 3C and D. The term "element", used in the following discussion, refers to the minimum architected functional unit required TSNAP neural emulation capabilities, namely a weight register, a Y value register, and a multiplier symbolically indicated as $W_{ij}Y_j$. The register terminology of "Y" and $W_{ij}Y_j$ is kept through out the general processor discussion with out limiting the register usage to the neural emulation paradigm. The first "cell", FIG. 3A, is associated with the diagonal elements, $W_{ii} \times Y_i$, and the second "cell", General-Cell, FIG. 3B, is associated with the rest of the elements $W_{ij}Y_j$ and contains two elements placed in the General-Cell, shown in a top and bottom arrangement. The new form of processor cell, in general referred to as the Processor Element (PE), consists of the Diagonal-PE and the General-PE. The modifications to the basic processing structure, FIG. 3A and B, are shown in FIG. 3C and D and consist in the addition of a tag compare function, an optional instruction buffer, an instruction (INSTR) register, an expanded register file, Conditional Execution Bits (CEB) in each data register, a data path register, an instruction path bit, selector and distributor control structures, and expanded functions, such as division, square root, etc. that may be application specific in addition to multiplication, as represented by the EXecution Unit (EXU) block. These modifications are required for multiple reasons. First, since a processing element receives both instructions and data from the same source path, namely from the cell attached communicating ALU tree (CAT), a method of differentiating instructions from data must be used. It is assumed that a fixed format is used for the instructions and data allowing a fixed single bit field be used to differentiate instructions from data. Second, by utilizing programmable data path and instruction path registers in conjunction with a front end decoding and distribution mechanism, the destination for a received instruction or data word can be specified. Third, a tag compare function allows further capability in specifying instruction and data destination points. Fourth, since an instruction may specify multiple functions, an instruction register and instruction decoding, operand selection, function selection, destination selection, and execution mechanisms must be provided. Fifth, to provide flexibility in algorithmic capability, a register file with Conditional Execution Bits are provided along with capability of manipulating the CEBs. The execution of an instruction, whose result destination is a local PE register, is conditional based upon the state of the destination register's CEB. The CEB indicates whether a register can be modified or not. The PE programmability is obtained through the instructions which are decoded at a PE's instruction register received from either an optional instruction buffer or with no instruction buffer from the attached communicating ALU tree that is in a communications mode. Each PE upon receipt of an instruction in the instruction register will execute the operation specified by that instruction. The instruction types include a data/instruction path specification, data movement, arithmetic, and logical instructions. Each PE contains an instruction register for each processing element specifying the source and destination paths and EXU functions; a Diagonal-PE contains one instruction register and the General-PE contains two instruction registers.

Figure 8:
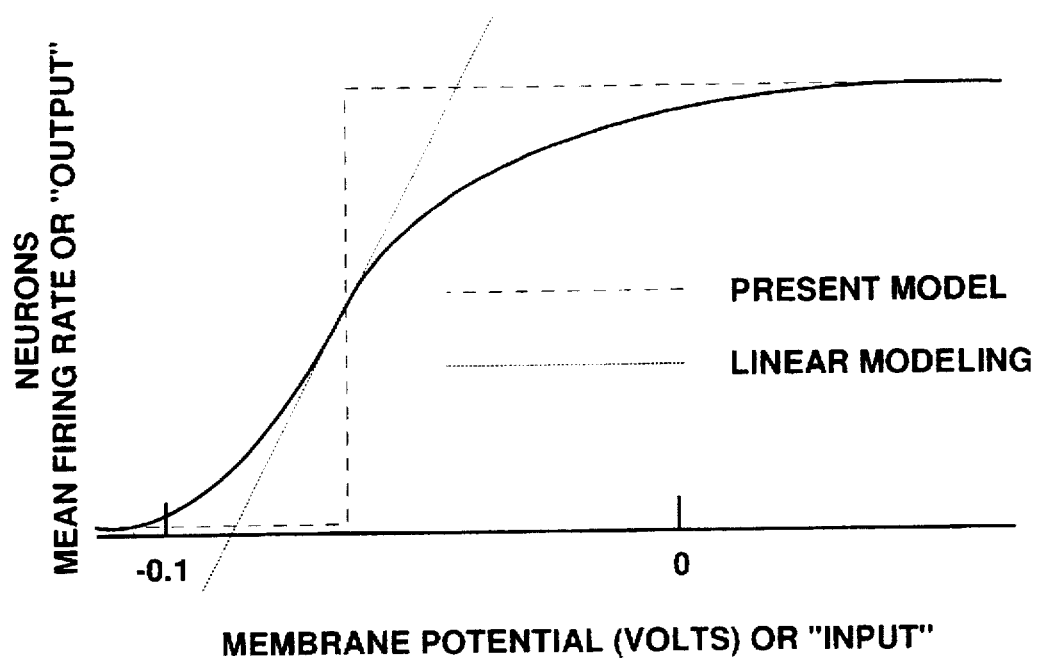
FIG. 8 illustrates the firing rate versus membrane voltage for a neuron according to a Hopfield model.

The modification to the T-SNAP cells must preserve the functional capabilities provided by the original cells, in order to support neural emulation as well as other applications requiring similar capabilities. An essential, novel, and general purpose functional capability provided by the T-SNAP multiplier cells, that must be maintained in the new processor cell structure, concerns the emulation of completely connected processors, for example neuron processor as used for completely connected networks the neurons of one such completely connected network are described in Hopfield 82 as follows. The input to a particular neuron arises from the current leaks of the synapses to that neuron, which influence the cell mean potential. The synapses are activated by arriving action potentials. The input signal to a cell i can betaken to be $$\sum_j T_{ij} V_j$$

where $T_{ij}$ represents the effectiveness of a synapse. FIG. 8 thus becomes an input-output relationship for a neuron.

Another such network is described in Hopfield 84as follows. The original model used two-state threshold "neurons" that followed a stochastic algorithm. Each model neuron i had two states, characterized by the output $V_i$ of the neuron having the values of $V^0$ or $V^1$ which may often be taken as 0 and 1, respectively). The input of each neuron came from two sources, external inputs $I_i$ and inputs from other neurons. The total input to neuron i is then $$\text{Input to } i = H_i = \sum_{j \neq i} T_{ij} V_j + I_i.$$

The element $T_{ij}$ can be biologically viewed as a description of the synaptic interconnection strength from neuron j to neuron i.

Figure 9:
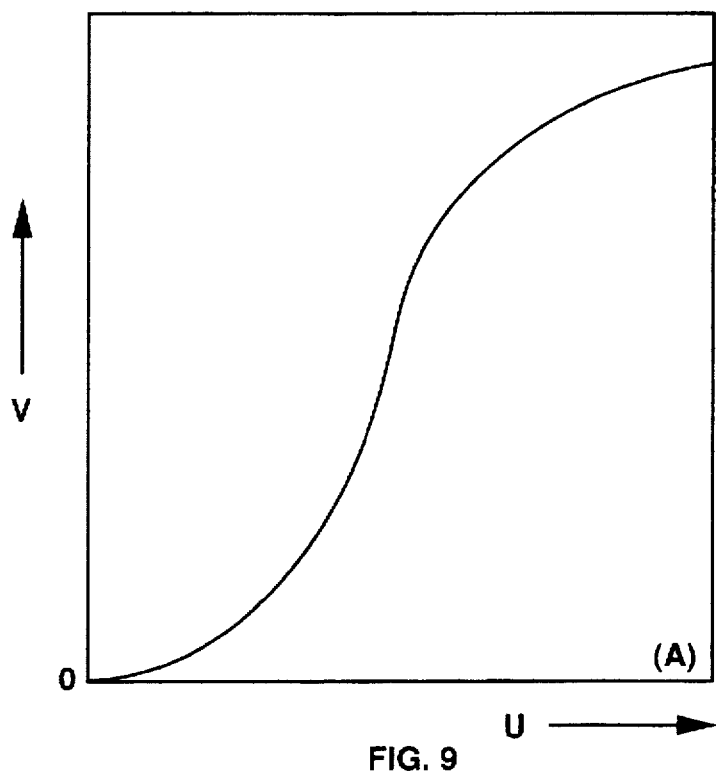
FIG. 9 illustrates a sigmoid input-output relation for a neuron.

We now construct a model that is based on continuous variable and responses but retains all the significant behaviors of the original model. Let the output variable $V_i$ for neuron i have the range $V^0 \leq V_i \leq V^1$ and be continuous and monotone-increasing function of the instantaneous input $u_i$ to neuron i. The typical input-output relation $g_i(u_i)$ shown in FIG. 9 is sigmoid with asymptotes $V^0$ and $V^1$. For neurons exhibiting action potentials, $u_i$ could be thought as of the mean soma potential of a neuron from the total effect of its excitatory and inhibitory inputs. $V_i$ can be viewed as the short term average of the firing rate of the cell i. Other biological interpretations are possible—for example, nonlinear processing may be done at junctions in dendritic arbor (7), and the model "neurons" could represent such junctions. In terms of electrical circuits, $g_i(u_i)$ represents the input-output characteristic of a nonlinear amplifier with negligible response time. It is convenient also to define the inverse output-input relation, $g_i^{-1}(V)$.

In a biological system, $u_i$ will lag behind the instantaneous outputs of $V_j$ of the other cells because of the input capacitance (RC) charging equation that determines the rate of change of $u_i$.

$$C_i(du_i/dt) = \sum_j T_{ij} V_j - u_i/R_i + I_i$$

$$u_i = g_i^{-1}(V_i).$$

$T_{ij} V_j$ represents the electrical current input to cell i due to the present potential of cell j, and $T_{ij}$ is thus the synapse efficacy. Linear summing of inputs is assumed. $T_{ij}$ of both signs should occur. $I_i$ is any other (fixed) input current to neuron i.

Figure 10:
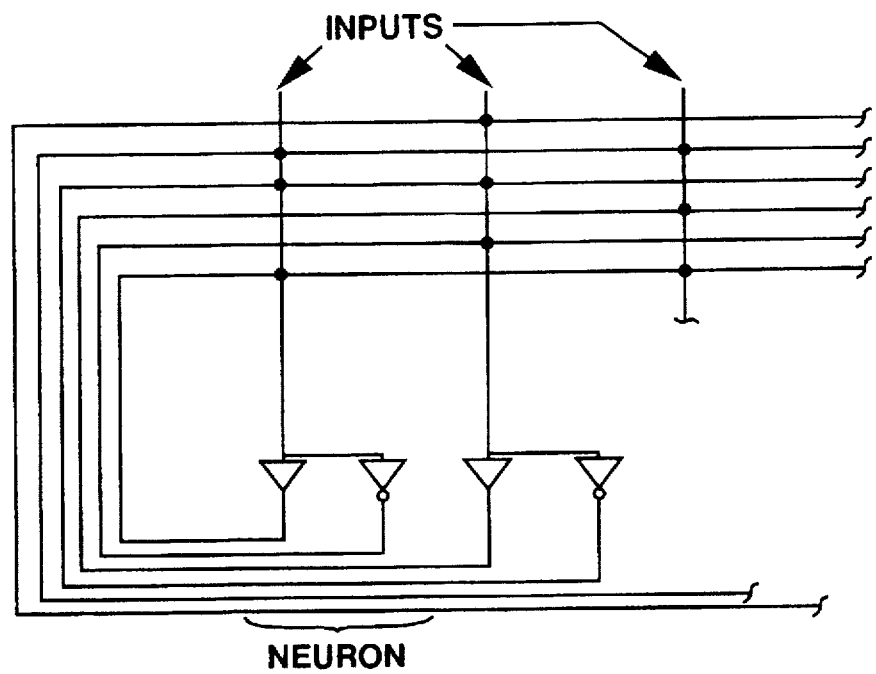
FIG. 10 illustrates a circuit corresponding to the resistance capacitone charging equation for fast amplitiers.

The same set of equations represents the resistively connected network of electrical amplifiers sketched in FIG. 10. It appears more complicated than the description of the neural system because the electrical problem of providing inhibition and excitation requires an additional inverting amplifier and a negative signal wire. The magnitude of $T_{ij}$ is $1/R_{ij}$, where $R_{ij}$ is the resistor connecting the output of j to the input line i, while the sign of $T_{ij}$ is determined by the choice of positive or negative output of amplifier j at the connection site. $R_i$ is now $$1/R_i = 1/p_i + \Sigma 1/R_{ij},$$

where $p_i$ is the input resistance of amplifier i. $C_i$ is the total input capacitance of the amplifier i and its associated input lead. We presume the output impedance of the amplifiers is negligible. These simplifications result in the resistance-capacitance equation being appropriate also for the network of FIG. 10. This important function is briefly reviewed using the original T-SNAP cells FIG. 3A and B. For example, with a neural network model in an execution mode, implying a multiplication operation in each processing cell, the diagonal cell multiplies its stored weight with its stored Y value and supplies the multiplied result to the attached add tree. In the communications mode for the diagonal cells, a Y value is received from the attached add tree and stored into the Y value register. The "General-Cells" of the structure also generate a weight times Y value and supply the product to their attached add trees. In the communications mode for these "General-Cells", a $Y_j$ value received from the bottom multiplier add tree is stored into the top Y value register and likewise a $Y_i$ value received from the top multiplier add tree will be stored into the bottom Y value register. This switch in storing the Y values is an essential characteristic supporting complete connectivity. For the modified processing cells, FIG. 3C and D, this path switch is programmable allowing further unique architectural features for processing, as will be described in the Processor Element Instruction Set section of this Chapter. To preserve the internal path switch function of the original T-SNAP cells, the new processor cells require that the data path registers be specified (loaded) in advance of receiving data from a tree. The data path register specifies the destination of the Yj data received from the bottom tree to be the top Yj register and the destination of the Yi data received from the top add tree to be the bottom Yi register thereby preserving the complete connectivity function.

The symbolic summation tree is shown on the left of FIG. 4 with ALUs at each stage designated by the letter A. The more detailed representation of the communicating ALU tree structure that will be used is shown on the right-hand side of FIG. 4. Pipeline latches have been left out for more clarity. For specific applications, the ALU function might be as simple as a bit-serial adder or provide more complex programmable functions requiring an instruction set architecture. For the purposes of describing the function execution and communications operations a summation operation may be referred to in this text. The use of the summation function is for simplicity of explaination and not intended to imply a limit to the functionality the communicating ALU tree can provide. In addition, the tree nodes' control mechanism, that determines the nodes operational mode and function, can use separate control lines or tagged tree node instructions. For a single node function such as addition and two operational modes, namely communictions and function execution, a single control line implementation is feasible. If more extended functions are to be supported in a tree node, then not only would additional control mechanisms be required but storage elements may be required in a tree node. In addition, if multiple functions are provided in the tree nodes then a method of synchronistically controlling tree operations must be utilized. If varying function execution timings are to be allowed in each tree node then an asynchronous interfacing method must be provided between the tree stages. For simplicity of implementation that guarantees the synchronization control, a restriction could be enforced that the same operation be specified for each tree stage. In FIG. 4 three ALU elements are shown in a 2 stage pipelined tree arrangement. The ALU element has a SWitch 1, SW1, block on its output and two SWitch 2s, SW2, blocks bypassing the ALU. The communicating ALU tree can be placed into one of two modes, namely a function execution mode and a communications mode, also termed a bypass mode. A common control signal is used at each ALU element in order to guarantee that all nodes of the tree provide the same mode of operation. One of the functions specified by the tree control signal, an accompanying tag signal or common distributed signal, is the ALU bypass. Both switches, SW1 and SW2, have an on/off control which, when in the "off" state, keeps the switch open, i.e. in a high impedance state and when in the "on" state bypasses the ALU (node function) via a low impedance path. When SW1 is enabled SW2 is disabled and vice versa. In this manner the ALU tree can provide the summation function, for example, in one direction, SW1's on SW2's off, while essentially acting as a communication path in ALU bypass mode, SW1's off—SW2's on. The ALU tree using 2 to 1 functional elements, such as 2-1 adders, will require $\log_2 N$ stages. Alternatively, the ALU function and communication mode can be implemented with 3-1, 4-1, . . .., N-1 functional elements such as 3-1, 4-1, . . .., N-1 adders, and their bypass switches, utilizing all the same element types or in combination, to produce the specified function. It should be noted that the Communicating ALU, FIG. 4, represents its logical function since, for example, depending upon technology, the SW1's function could be incorporated in the gate devices used in the last internal stage of each ALU element, thereby adding no additional delay to the ALU function. Alternatively, a separate communications tree path could be provided, thereby allowing communications to occur while an ALU function is in progress.

Figure 5B:
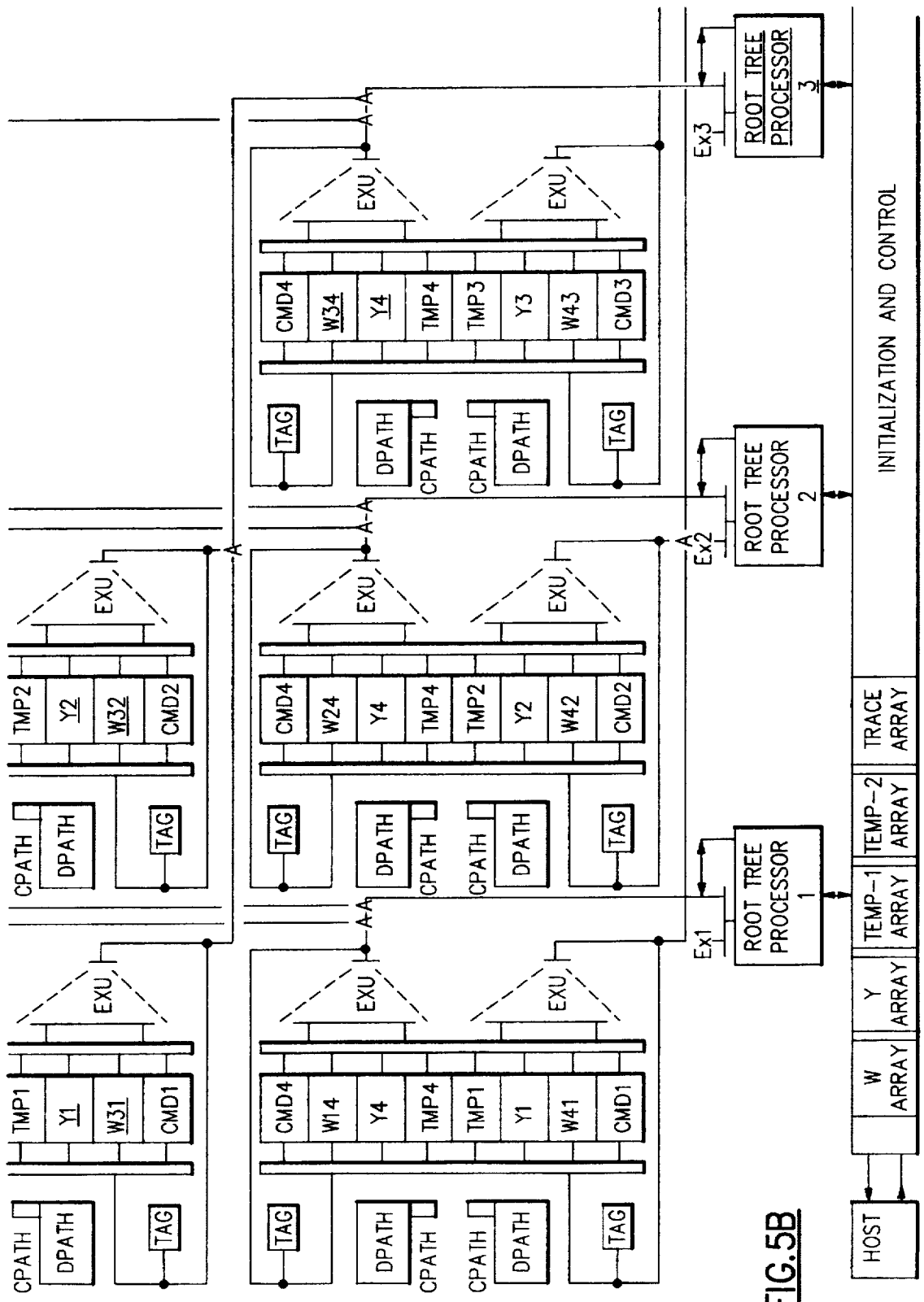
FIG. 5 illustrates a $4^2$ PE and 4-Root Tree Processor Massively Parallel Diagonal-Fold Tree Array Processor, and is divided into FIGS. 5A, 5B and 5C for convenience.

A 4 Root Tree Processor example is shown in FIG. 5 which connects the sixteen PEs with four CATs and four Root Tree Processors with a Host interface to provide a complete picture of the machine organization used in the Massively Parallel Diagonal-Fold Tree Array Processor. The CATs are assumed to provide a summation function in ALU exectuion mode. An example of the elements involved in a sum of "W * Y" register products calculation for the third Root Tree Processor $RTP_3$ is written here and highlighted in FIG. 5.

$$RTP_3 = F(W_{3,1}Y_1 + W_{3,2}Y_2 + W_{3,3}Y_3 + W_{3,4}Y_4)$$

The Host interface represent a central control point for the array of PEs allowing the Host to have access to the Root Tree Processors' internal storage possibly containing, for example, the initial parameters W, Y, etc., calculated values, and traced values. There is assumed to be a Root Tree Processor for each communicating/function execution tree and their N attached PEs. Each Root Tree Processor issues instructions and data to the N tree attached PEs through the communications mode of tree operation. Additional functions the Root Tree Processor and Host interface include the following:

1. All processor initializations
2. Starting the system
3. Stoping the system
4. communicating ALU tree control
5. PE instruction and data issuing In operation, the $N^2$ PE structure might require an initialization of certain registers. Even though specific registers could be initialized by sending uniquely PE tagged values to individual processors, $N^2$ operations would be required. An alternative scheme would be to connect the PE registers in a serial daisy chained fashion for LSSD scanning—see Eichelberger 77. LSSD scanning supports testing and register initialization. Each Root Tree Processor and its attached N PEs may have one or up to multiple scan strings depending upon an implementation technology. For example, a separate scan path containing only the "W" registers for each Root Tree Processor can be provided resulting in N "W" register scan paths which can be used for initialization purposes. Other initialization mechanisms are clearly possible and it will be assumed the appropriate method can be chosen during the implementation design process. Parameter values common to a Root Tree Processor's N attached PEs can be loaded through the communicating ALU tree.

4. PROCESSOR ELEMENT INSTRUCTION SET

An example instruction set providing the previously discussed capability will be reviewed in this section, beginning first with a presentation of an example format for the instructions and data and continuing with an example instruction set description.

A set of decisions must be made to determine an architecture for a processing element. One major set of decisions concerns the format of instructions and data—and the other major set of decisions concerns the functions to be executed by the architecture. According to Flynn 85, the instruction is a specification of logical entities consisting of a format, an operation, a number of source operands, a result operand, and a next instruction location. Specification can be done in several ways.

1) By coordinate address;
2) by implication;
3) immediately; or
4) by association (by partial record).

Practically speaking, most object specification is done by either coordinate address or implication. Occasionally, specialized information such as shift amount is specified immediately. The format and operation are specified by codes which provide information to the processor control unit. For many familiar organization, the opcode is an encoding of both format and operation information to be used during the execution of the instruction. For our purposes, the operation simply refers to the semantics of the transformation specified in the instruction. The format then specifies everything else—the combination is referred to as the opcode.

Figure 11:
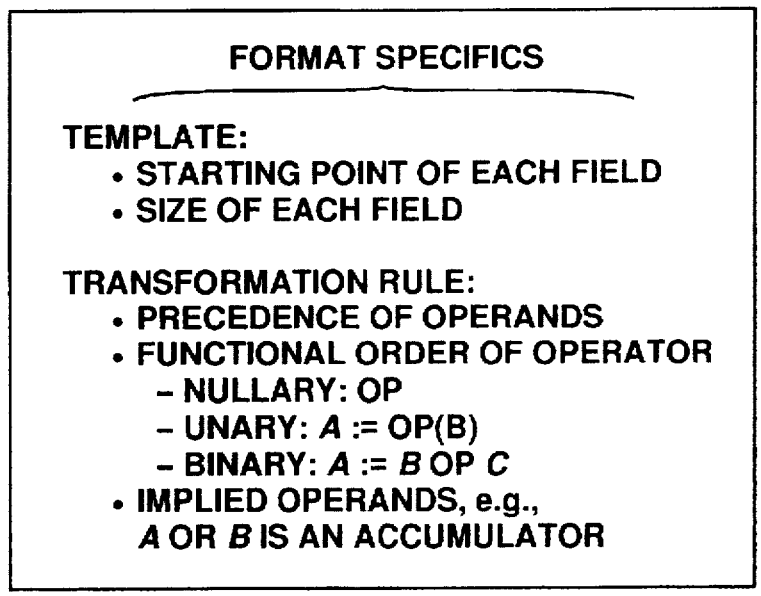
FIG. 11 illustrates the information in the field format.

The format provides two types of information: template information and transformation information (FIG. 11). While these two roles can be separated, in most instruction sets, the format is the object designated to supply both template and transformational information.

Figure 12:
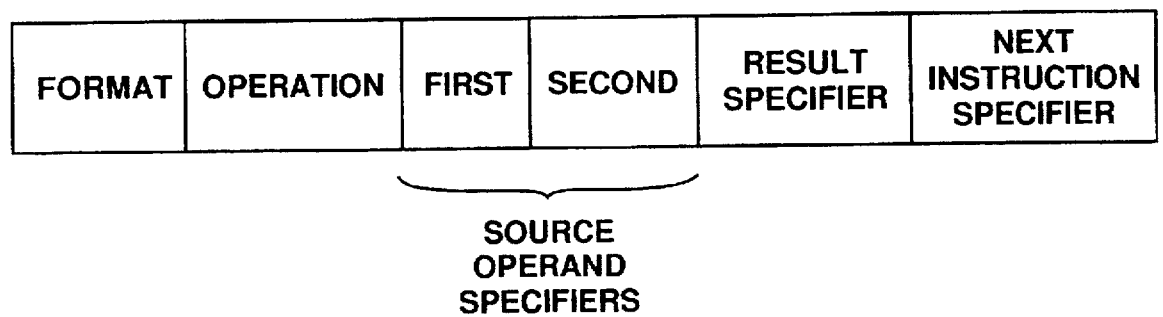
FIG. 12 illustrates an instruction vector.

The template identifies the starting point and size of each explicit field (or syllable) contained in the instruction (FIG. 12). If the template is not trivial (i.e., a single template for all instructions in the instruction set), it is usually computed from transformational information and a known starting point and size of the elements. For some instructions sets, the size of an element varies by its type. Thus, in this case, the format must supply information not only about the transformation, but also about the type of the object or operand referred to by the instruction.

The transformation specifies the functional order and rule. The functional order is simply the number of source operands involved in computation; i.e., the number of arguments taken by the operation. Regardless of the functional order of the operation, it is assumed that the operation produces at most one result (it may produce none). Since each Root Tree Processor issues instructions and data to N Processors Elements, a desirable capability for enhanced programming flexibility would be to extend the instruction and data format to include a processor group identification field. Consequently, the instruction format has the requirements to identify processors or groups of processors, separate instructions from data, identify operands, and result destinations.

Figure 6:
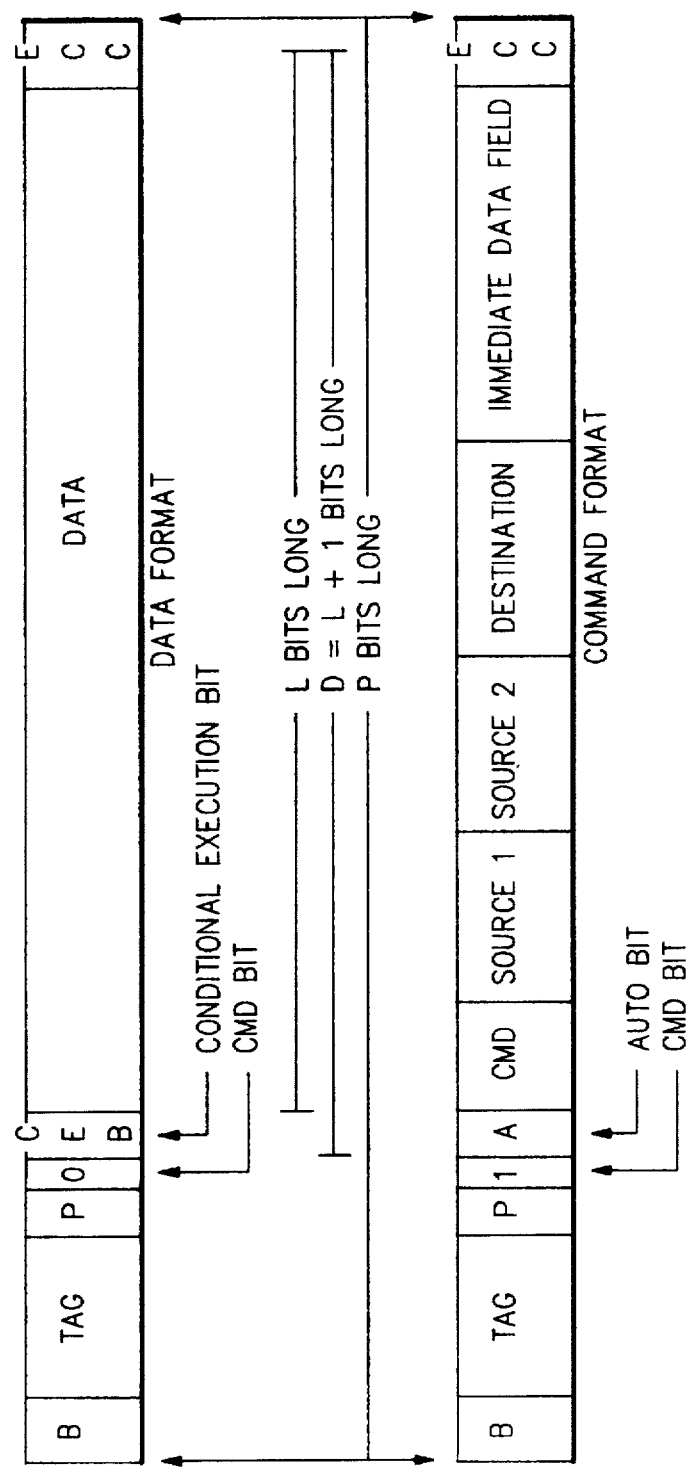
FIG. 6 illustrates a Processor Element tagged instruction/data format.

Even though other formats are clearly possible, we choose the example format depicted in FIG. 6 on page 6. Both specific Processor Elements and groups of PEs can be identified with the addition of tag bits and a Broadcast, "B", bit added to all communications, and tag and "B" bit compare functions in each PE. A "B" bit is added as the first bit in the field indicating a broadcast instruction/data for B=1 and a tagged instruction/data for B=0. A broadcast message/data goes to all N Processor-Elements linked to a particular $Y_i$ Root Tree Processor, independent of the TAG. The TAG field must be at least $\log_2 N$ bits long, if specific identification of all Processor Elements belonging to a Root Tree Processor is to be accomplished. Alternatively, groups of Processor Elements can utilize the same tag value, thereby uniquely identifying groups of PEs. The received tag is bit by bit compared with a stored tag in each PE. After the last tag bit compare is completed, it is known whether the following INSTR/DATA is to be received by that particular PE. A tag match results in a INSTR or Data being received, while a no match situation prevents the reception of a INSTR or Data. A parity bit or error correction bits denoted by a P can also be included in the tag field, as shown in FIG. 6, for error handling reasons.

The communicated instructions or data also contain a single bit (INSTR) indicating whether the bit string is data or instruction, and for instructions additional fields for specifying an automatic execution mode (AUTO), instruction opcode (INSTR), operand selection (SOURCE1 and SOURCE2), and result destination (DESTINATION). Error correction/detection bit/s (ECC) can be included on both instructions and data for error handling reasons. It is assumed that the instruction and data bit lengths are the same. FIG. 7 lists the present instruction set functions.

The instruction set may contain, arithmetic operations, for example, add, subtract, multiply, divide, square root, etc., logical operations, for example, AND, OR, EX-OR, Invert, etc., Compare, shift, and data storage movement operations. The instruction set is primarily determined from an application specific perspective.

A fairly standard instruction format is used with the unique addition of the AUTO bit as representing an automatic execution mode. The auto execution mode represents a capability that switches the execution mode of the PEs from an instructions execution only mode to a data dependent mode of execution. The control of the switch from a control flow execution mode to a data flow execution mode is programmable by use of the AUTO bit to engage the data flow mode and a rule that allows the return to control flow instruction execution mode. An instruction with the AUTO bit active is executed first due to normal instruction control flow execution sequencing and then it is executed each time valid data is received in the processing unit. The data flow execution continues until a new instruction is received which stops the previous "AUTO" instruction from executing and begins the execution of the newly received instruction, which may also be another AUTO instruction.

To demonstrate the importance of the AUTO mode for processing, a simple example using the Hopfield neural network will be presented. For this discussion, instruction mnemonics, as presented in the example instruction set architecture of FIG. 7, are used. Assume the Hopfield neural network model as previously discussed is used as an example, for the direct emulation of the network neurons sum of connection weight times connecting neuron output values. Each network update cycle consists of weight times Y value multiplication operations, summation of multiplication results, the generation of the nonlinear sigmoid neuron output Y values, and the communication of the generated Y values to the processing elements. The network updates continue until a network minimum is reached. For simplicity of discussion, assume that network convergence is not tested for on every cycle, but only after some multiple cycles have been executed. For the network emulation using the Processor Elements, an automatic mode can be specified where, instead of requiring the repeated sending of a Multiply instruction to the PEs after each network execution cycle in order to initiate the next network cycle, the automatic mode would begin the next update cycle automatically after receipt of the newly calculated Y values. This automatic mode is initiated by setting the AUTO bit to a "1" in the instruction desired, such as Multiply (MPY) for use in the Hopfield network example, which sets an automatic mode flag in the PEs. The first operation is initiated with the receipt of the instruction with the AUTO bit set to a "1" and the instruction would be repeatedly executed upon receipt of the new updated data continuing until a new instruction is received which terminates the automatic mode, such as receipt of a NOP instruction. A capital A is appended to an instruction mnemonic to indicate that the auto bit is to be set to a "1", for example MPYA.

Figure 3D:
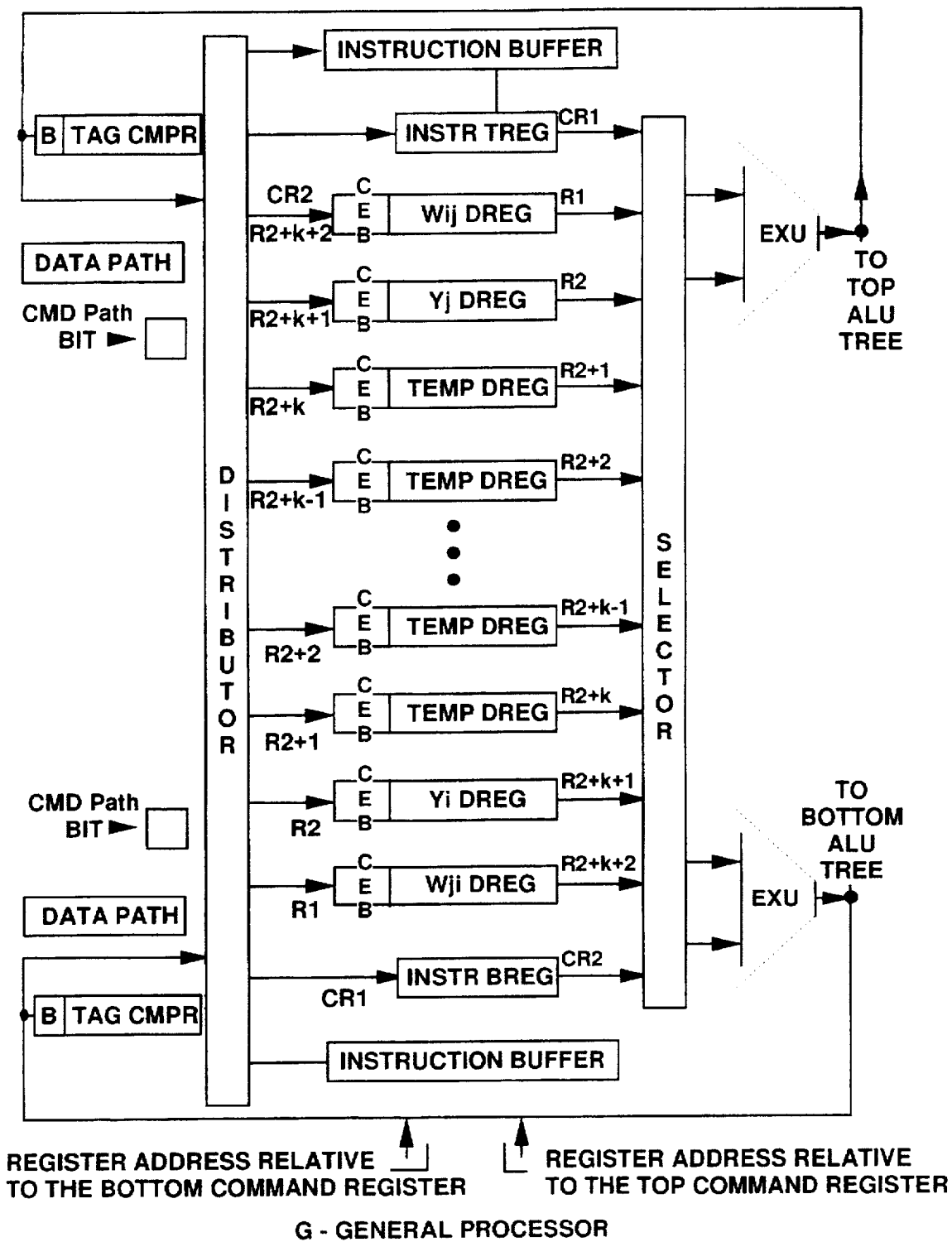

The source and destination addresses specified in FIG. 7 are relative to the instruction register where the instruction is received. The relative addressing is shown in FIG. 3D where the top instruction register INSTR TREG relative addresses are shown in columnar fashion, located to the right of the register blocks, while the relative addressing for the bottom instruction register INSTR BREG is shown in columnar fashion, located to the left of the register blocks. For "k" temporary or working registers, it should be noted for example, that the bottom data register R2 is the same as the top data register R(2+k+1). A bit string received from the ALU tree, if it is an instruction, is serialized into one of the two INSTR registers in each General-cell, as directed by the INSTR PATH BIT, and the single INSTR register of a Diagonal-Cell. A data bit string received from the ALU tree, is serialized to one of the k+4 other registers available in a General-cell and one of the k/2+2 other registers available in a Diagonal-Cell as specified by the DATA PATH register. It is assumed that for a symmetrical structure the Diagonal-Cells contain half the number of instruction and data registers as compared to the General-Cells. In the Diagonal-PEs a source or destination address of R(2+k/2+1) through R(2+k+2) and CR2 are mapped as follows:
R(2+k/2+1) R(2+k/2)
R(2+k/2+2) R(2+k/2−1)
continuing
R(2+k/2+k/2+2)=R(2+k+2) R(2+k/2−k/2−1)=R1
CR2→CR1

For example, assume a k=2 working registers in the General-Cells and three bit source or destination address then having the General-Cells use all three bits and the Diagonal-Cells use only the 2 lsb bits, the proper mapping can be provided by:
000→CR1
001→R1
010→R2
011→R3
100→CR2
101→R6
110→R5
111→R4

The PATH instruction is treated differently from the other instructions, since it controls the instruction path selection mechanism. The PATH instruction is decoded prior to the distributor logic. FIG. 3 and the DATA PATH register or INSTR PATH BIT loaded according to destination field. A possible format for the PATH instruction destination field would be to use the first bit position for CR½ and the other bits for register path selection, others formats are clearly possible. The PATH instruction must be reissued if a different path is desired. A default path is specified by the architecture for initialization purposes, for example the DATA PATH registers could be initialized to R5, the Y value register to support a completely connected network, and the INSTR PATH BIT set to a "1" indicating the instructions switch path also. All PE data registers are (D=L+1) bits in length, due to the conditional execution bit in each data register, see FIG. 6 showing the instruction and data formats. If a CEB is set to a "zero" in an instruction's destination register, that instruction will be treated as a NOP instruction, ie. the destination register's contents will not be changed and "zeros" will be fed to the Add tree. If the CEB is set to a "one" the register's contents can be modified. For example, this bit is used on the W registers to identify the presence or absence of a value since a zero value is not always sufficient to accomplish this. "Zeros" are always fed to the Add tree if the Add tree is not a destination point or a NOP situation is occurring. The CEBs can be set upon initialization through the chips scanning facility, the path instruction, or in a data value received from the tree.

By allowing the instruction and data paths to be programmable, two operational modes for network emulation become possible. In the first mode, termed YIN mode, for all processors, the instruction received from the bottom Adder tree is sent to INSTR BREG (CR1) and the instruction received from the top Adder tree is sent to INSTR TREG (CR1). Then for YIN mode each PE will function as specified in the instruction field. In this fashion, each Root Tree Processor can be specified with a different input PE processing function, common across all PE inputs to that Root Tree Processor. For example, referring to FIG. 5, all inputs to Root Tree Processor 4 may be specified with a (W register value * Y value) multiply operation while all inputs to Root Tree Processor 2 may be specified with an Temp. register value * Y value operation. Since all communicating ALU trees are independent of each other, each PE input function can have different execution times in YIN mode for different Root Tree Processors implying that the summation results would occur at different times, which can cause synchronization problems in the interface to the Root Tree Processors, if not handled correctly. YIN mode can be used to asynchronously select a Root Tree Processor and its set of PEs for processing. In the second mode, termed YOUT mode, for all Root Tree Processors, the instruction received from the bottom Adder tree is sent to INSTR TREG (CR2) and the instruction received from the top Adder tree is sent to INSTR BREG (CR2). Consequently, for YOUT mode all Root Tree Processor value outputs will have the same function applied at their input destination PE. In this way each Root Tree Processor can have multiple functions at its input PEs. For example, referring to FIG. 5, all Y4 destination PEs may be specified with a (W register value * Y value) multiply operation while all Y2 destination PEs can be specified with a (Temp. register value * Y value) operation. All functions specified at a PE input must execute in the same length of time even though the functions are different. In general, YIN mode and YOUT mode can not be interchanged among the Root Tree Processors within a single model or problem structure as conflicts could result. For the simple Hopfield network emulation example the Root Tree Processors functioning as neurons specified the YOUT mode with all Root Tree Processors issuing the same instruction to all PEs.

Many instructions specify a destination which is local to the individual Processor Element. This local processing can cause synchronization problems if not handled correctly. Instead of proliferating synchronization mechanisms throughout the structure the local processing synchronization problem can be localized to the Root Tree Processors. For example, if no notification of local processing completion is generated from the PEs, a fixed hardware mechanism can be provided at the Root Tree Processor to guarantee safeness of the operations. It is also not desirable to "solve" the problem via means of queues in the Processor Elements as this increases the size of the PE limiting the number which could be placed on a single chip. Rather, the instruction issuing point should be used to resolve and avoid all hazards. Any local processing instruction to the same PE must be separated from the next instruction to that same PE by the specified processor instruction's execution time. For example, if the multiply executed in 2L clocks, a 2L time out must be ensured prior to sending the next instruction. This is necessary so that an instruction buffer register is not required, thereby allowing each instruction to remain constant in a PE during the operation of the function instructioned. Each Root Tree Processor can then be set up with a synchronization mechanism to safely issue instructions to each PE at a maximum rate. Non-local instructions, i.e. those instructions where the destination is the ADD TREE, provide notification of operation completion when the converged tree result reaches the Root Tree Processors. For non-local instructions the Root Tree Processors wait until a result is received before sending a new instruction to the PEs attached to that tree.

As a final note, a compiler would be required to ensure no destination conflicts occur in programs using the described instruction set.

8. MATRIX PROCESSING EXAMPLE

The following detailed procedure will be followed, see PE example instruction sets: (Note that the PE instructions are indicated by PE-instruction Mneumonic and don't care states indicated by (x).)

1. CATS placed into communication mode
2. Initialize W matrix into PE registers
3. Each Root Tree Processor memory is initialized as follows:

Root Tree Processor 1 initialized with Y11, Y12, ..., Y1N.
Root Tree Processor 2 initialized with Y21, Y22, ..., Y2N.
.
.
.
Root Tree Processor N initialized with YN1, YN2, ..., YNN.

4. Initialize the Root Tree Processor and PE PATH registers:
   Set PE INSTR PATH Bit to CR2 indicating YOUT mode
   Set PE DATA PATH to R2
5. All Root Tree Processors are active
6. Root Tree Processors send the first row of Y values to the PEs.
7. Root Tree Processors send PE-MPYA R1*R2→ADD TREE, after sending the instruction to the PEs, the Root Tree Processors place the CATs into the summation mode.
8. Root Tree Processors receive the summation results from the CAT roots.
9. Root Tree Processors send the second row of Y values to the PEs.
10. While the PEs and CATs are calculating the next row of the result matrix, the Root Tree Processors can store the first row of the result matrix, in this example to the additional storage capacity assumed present.
11. Since the Auto mode was specified in the PE-MPYA instruction, the PEs upon receipt of the second row Y values will automatically execute a PE-MPY R1*R2→ADD TREE with CAT results to be received in the Root Tree Processors.
12. The Root Tree Processors send the third row of Y values and stores the second row of the result matrix. The process continues until
13. Root Tree Processors store the last row of the result matrix.

At completion of operation, the original Y and W matrices are intact and the result matrix is located in the Root Tree Processors' additional storage area which can then be further operated upon by the Root Tree Processors or. Host system.

Matrix addition and Boolean operations can also be supported by the structure. Assuming matrices of the same form as given in FIG. 2, both Y and W matrices can be loaded into the PE array since there are $N^2$ unique Y and W registers in the structure. Local addition or Boolean operations on the Y and W registers can be done within the structure with the result sent to the temporary registers. At completion of the operation, the original Y and W matrices will remain intact in the structure and the temp regs will contain the result matrix. The result can be scanned out or individually read out from the Processor Element cells or used for further operations (chaining or linking of instructions).

While we have described our preferred embodiments of our invention it will be understood that those skilled in the art, both now and in the future, upon the understanding of these discussions will make various improvements and enhancements thereto which fall within the scope of the claims which follow. These claims should be construed to maintain the proper protection for the invention first disclosed.

What is claimed is:

1. A computer system comprising:
    a plurality of processing elements (PEs) arranged in a manner logically equivalent to a two-dimensional array wherein each one of said PEs is addressable by one of a plurality of unique ordered pairs of identifiers (x,y) wherein each x designates a column corresponding to one of said each one of said PEs and wherein each y designates a row corresponding to one of said each one of said PEs;
    a plurality of root tree processors, the root tree processors each coupled to PEs designated by a same x identifier value for sending and receiving data and instructions from and to each of said PEs designated by the same x identifier value;
    said plurality of PEs interconnected whereby each PE addressed by $(x_1,y_1)$ is coupled to one PE addressed by $(y_1,x_1)$, wherein $x_1$ is not equivalent to $y_1$, such that coupled ones of the PEs are each connected to a separate selector circuit for selectively outputting a result of one of the coupled ones of the PEs; and
    a plurality of diagonal PEs each comprising an individual PE designated by those of the unique ordered pairs of identifiers wherein x is equivalent to y.

2. The computer system of claim 2, wherein each of the plurality of processing elements include means for sending and receiving the data and instructions, storage for data and instructions received in said each of the plurality of processing elements, and means for executing the instructions received in said each of the plurality of processing elements.

3. The computer system of claim 2, wherein each of the plurality of root tree processors include means for sending and receiving the data and instructions, storage for data and instructions received in said each of the plurality of root tree processors, and means for executing the instructions received in said each of the plurality of root tree processors.

4. The computer system of claim 3, wherein the plurality of root tree processors include broadcasting means for sending the instructions and data to all the processing elements, said root tree processors coupled together and to a host computer via a host interface.

5. The computer system of claim 4, wherein the root tree processors receive initialization data from the host computer and send the initialization data via the broadcasting means.

6. The computer system of claim 4, wherein the root tree processors receive the data and instructions from the host computer and send the data and instructions to selected processing elements.

7. The computer system of claim 2, wherein the storage for data received in said each of the plurality of processing elements includes means for storing a conditional execution bit for determining whether said each of the plurality of processing elements executes the received instruction.

8. The computer system of claim 2, wherein the storage for data received in said each of the plurality of processing elements includes means for storing a conditional execution bit for determining whether data stored in said storage for data received in said each of the plurality of processing elements can be modified.

9. The computer system of claim 1, wherein each of the plurality of processing elements include means for tag matching for determining whether to receive the data and instructions, the means for tag matching including means for comparing a tag sent with the data and instructions with a processing element tag.

* * * * *